United States Patent
Gwidt et al.

(10) Patent No.: US 10,823,101 B1
(45) Date of Patent: Nov. 3, 2020

(54) SYSTEM AND METHOD FOR LEARNING AN INJECTOR COMPENSATION

(71) Applicant: GM GLOBAL TECHNOLOGY OPERATIONS LLC, Detroit, MI (US)

(72) Inventors: J. Michael Gwidt, Brighton, MI (US); Daniel P. Himes, West Bloomfield, MI (US); Andrew M. Shaw, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/674,571

(22) Filed: Nov. 5, 2019

(51) Int. Cl.
| | |
|---|---|
| F02D 41/24 | (2006.01) |
| F02D 41/14 | (2006.01) |
| F02D 41/30 | (2006.01) |
| F02D 41/26 | (2006.01) |
| F02D 41/40 | (2006.01) |
| F02D 41/20 | (2006.01) |

(52) U.S. Cl.
CPC ..... *F02D 41/2467* (2013.01); *F02D 41/1402* (2013.01); *F02D 41/263* (2013.01); *F02D 41/3005* (2013.01); *F02D 41/402* (2013.01); *F02D 2041/1415* (2013.01); *F02D 2041/2055* (2013.01); *F02D 2200/0602* (2013.01); *F02D 2200/0614* (2013.01); *F02D 2200/0618* (2013.01)

(58) Field of Classification Search
None
See application file for complete search history.

(56) References Cited

U.S. PATENT DOCUMENTS

| | | | | |
|---|---|---|---|---|
| 7,845,343 | B2* | 12/2010 | Imai | F02D 41/1497 |
| | | | | 123/198 F |
| 9,435,281 | B2* | 9/2016 | Parrish | F02D 41/20 |
| 9,689,342 | B2* | 6/2017 | Ranga | F02D 41/2467 |
| 9,863,355 | B2* | 1/2018 | Gopalakrishnan | F02D 41/20 |
| 9,932,947 | B2* | 4/2018 | Nehl | F02M 51/0625 |
| 10,060,399 | B2* | 8/2018 | Namuduri | F02D 41/20 |
| 10,190,526 | B2* | 1/2019 | Nehl | F02M 57/005 |
| 10,294,882 | B2* | 5/2019 | Sanborn | F02D 41/1454 |
| 10,309,331 | B2* | 6/2019 | Hauser | F02D 41/20 |

(Continued)

*Primary Examiner* — Kevin R Steckbauer
(74) *Attorney, Agent, or Firm* — Quinn IP Law (57) ABSTRACT

A method of operating a fuel injector includes determining a fuel pressure and a total fuel mass $M_{TF}$ to be injected per combustion cycle, defining first and second pulse widths $PW_1$ and $PW_2$ corresponding to first and second commanded fuel masses $CM_1$ and $CM_2$ wherein $CM_1+CM_2=M_{TF}$, actuating the injector for the first and second pulse widths, detecting an opening delay for the injector, and storing the opening delay. The method may further include increasing $PW_1$ and decreasing $PW_2$ by a predetermined amount, repeating selected steps until $PW_2$ is less than or equal to a predetermined minimum pulse width, changing the fuel pressure by a predetermined pressure amount, cycling through selected steps until the fuel pressure reaches a predetermined target fuel pressure, and commanding the injector to open earlier than a normally commanded opening time by a lead time based on stored opening delay data.

19 Claims, 4 Drawing Sheets

(56) References Cited

U.S. PATENT DOCUMENTS

| | | | |
|---|---|---|---|
| 10,316,786 B2* | 6/2019 | Ranga | F02D 41/2467 |
| 10,655,583 B2* | 5/2020 | Omekanda | F02M 51/0671 |
| 2008/0308065 A1* | 12/2008 | Imai | F02D 41/221 |
| | | | 123/299 |
| 2015/0285175 A1* | 10/2015 | Parrish | F02D 41/222 |
| | | | 123/480 |
| 2016/0153387 A1* | 6/2016 | Ranga | F02D 41/2467 |
| | | | 701/104 |
| 2016/0153391 A1* | 6/2016 | Ranga | F02D 41/08 |
| | | | 701/104 |
| 2018/0347494 A1* | 12/2018 | Sanborn | F02D 41/2467 |
| 2019/0234333 A1* | 8/2019 | Sanborn | F02D 41/221 |

* cited by examiner

SYSTEM AND METHOD FOR LEARNING AN INJECTOR COMPENSATION

This disclosure relates generally to fuel injectors, and more particularly to systems and methods for learning an injector compensation.

In gasoline direct injection (GDI) and spark-ignited direct injection (SIDI) types of engines, a fuel injector is associated with each combustion cylinder. The fuel injectors are arranged in fluid communication with a fuel rail, which contains pressurized fuel. Electrical control signals are sent to each individual injector to command it to open and close in accordance with a timing sequence that corresponds to the combustion cycle of the respective cylinder associated with each injector.

It is known that there is a small delay between the time when an injector is commanded to open and when it has actually or substantially opened (known as "opening delay"), as well as when an injector is commanded to close and is actually or substantially closed (known as "closing delay"). This is a characteristic that each injector has, and it varies from injector to injector and can change over time due to wear and other factors.

SUMMARY

According to one embodiment, a method of operating a fuel injector includes determining a fuel pressure and a total fuel mass $M_{TF}$ to be injected by the fuel injector per combustion cycle, defining a first pulse width corresponding to a first commanded fuel mass $CM_1$ and a second pulse width corresponding to a second commanded fuel mass $CM_2$ wherein $CM_1+CM_2=M_{TF}$, actuating the fuel injector for the first pulse width and the second pulse width, separated by a pause between the first and second pulse widths; and detecting an opening delay for the fuel injector for at least one of the first and second pulse widths. The method may also include increasing the first pulse width by a predetermined pulse width amount and decreasing the second pulse width by the predetermined pulse width amount, and repeating the actuating, detecting, increasing and decreasing steps until the second pulse width is less than or equal to a predetermined minimum pulse width. The method may further include changing the fuel pressure by a predetermined pressure amount, and cycling through the defining, actuating, detecting, increasing, decreasing, repeating and changing steps until the fuel pressure reaches a predetermined target fuel pressure. The method may additionally include storing, after the detecting step, the opening delay for the at least one of the first and second pulse widths, and commanding the fuel injector to open earlier than a normally commanded opening time by a lead time based on stored opening delay data.

The actuating step may be performed for each of one or more combustion cycles, and a collection of opening delay data may be accumulated. The first pulse width may be actuated before the second pulse width, and the first pulse width may initially be approximately half of the baseline pulse width. Each opening delay may be an amount of time between the fuel injector being commanded to open and the fuel injector being substantially opened, and each opening delay may be detected by sensing a feedback voltage from the fuel injector.

According to one embodiment, a method of controlling a plurality of fuel injectors may include: (a) determining a fuel pressure and a total fuel mass $M_{TF}$ to be injected by each of the fuel injectors per combustion cycle; (b) defining a first pulse width corresponding to a first commanded fuel mass $CM_1$ and a second pulse width corresponding to a second commanded fuel mass $CM_2$, wherein $CM_1+CM_2=M_{TF}$; (c) actuating each of the fuel injectors for the first pulse width and the second pulse width, separated by a pause between the first and second pulse widths; (d) detecting an opening delay for each of the fuel injectors for at least one of the first and second pulse widths; (e) storing the opening delay for each of the fuel injectors for the at least one of the first and second pulse widths; (f) increasing the first pulse width by a predetermined pulse width amount and decreasing the second pulse width by the predetermined pulse width amount; (g) repeating the actuating, detecting, storing, increasing and decreasing steps until the second pulse width is less than or equal to a predetermined minimum pulse width and/or until the second commanded fuel mass $CM_2$ is less than or equal to a predetermined minimum commanded fuel mass $CM_{min}$; (h) changing the fuel pressure by a predetermined pressure amount; and (i) cycling through the defining, actuating, detecting, storing, increasing, decreasing, repeating and changing steps until the fuel pressure reaches a predetermined target fuel pressure. The method may further include (j) commanding each of the fuel injectors to open earlier than a respective normally commanded opening time by a respective lead time, wherein each respective lead time is based on respective stored opening delay data.

The actuating step may be performed for each of one or more combustion cycles, and a collection of opening delay data may be accumulated for each of the fuel injectors. Each opening delay may be detected by sensing a feedback voltage from a respective fuel injector.

According to one embodiment, a controller for controlling a plurality of fuel injectors may be configured to execute the steps of: determining a fuel pressure and a total fuel mass Mm to be injected by each of the fuel injectors per combustion cycle; defining a first pulse width corresponding to a first commanded fuel mass $CM_1$ and a second pulse width corresponding to a second commanded fuel mass $CM_2$, wherein $CM_1+CM_2=M_{TF}$; actuating each of the fuel injectors for the first pulse width and the second pulse width, separated by a pause between the first and second pulse widths; detecting an opening delay for each of the fuel injectors for at least one of the first and second pulse widths; storing the opening delay for each of the fuel injectors for the at least one of the first and second pulse widths; increasing the first pulse width by a predetermined pulse width amount and decreasing the second pulse width by the predetermined pulse width amount; repeating the actuating, detecting, storing, increasing and decreasing steps until the second pulse width is less than or equal to a predetermined minimum pulse width and/or until the second commanded fuel mass $CM_2$ is less than or equal to a predetermined minimum commanded fuel mass $CM_{min}$; changing the fuel pressure by a predetermined pressure amount; and cycling through the defining, actuating, detecting, storing, increasing, decreasing, repeating and changing steps until the fuel pressure reaches a predetermined target fuel pressure. The controller may be further configured to execute the step of commanding each of the fuel injectors to open earlier than a respective normally commanded opening time by a respective lead time, wherein each respective lead time is based on respective stored opening delay data.

The controller may include an injector driver configured to operatively connect by a respective signal path to each of the fuel injectors and to selectively command each of the fuel injectors to open and close, and a monitoring module configured to monitor a voltage of each respective signal path. The controller may include a memory and the controller may accumulate a collection of opening delay data in the memory for each of the fuel injectors. Each opening delay may be detected by sensing a feedback voltage from a respective fuel injector.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

Referring now to the drawings, wherein like numerals indicate like parts in the several views, a method and system for learning an injector compensation, and for utilizing that compensation to adjust the command timing for future injector events, are shown and described herein. Note that certain reference numerals in the drawings have subscripts, such as the four fuel injectors $62_A$, $62_B$, $62_C$ and $62_D$ of FIG. 4. Subscripts are used in the drawings and in the present description to refer to individual elements (such as the aforementioned injectors), while the use of reference numerals without subscripts may refer to the collective group of such elements and/or to a singular but generic one of such elements. Thus, reference numeral $62_A$ refers to specific injector, while reference numeral 62 (without the subscript) may refer to all the injectors, the group of injectors, or a singular but generic injector (i.e., any injector).

The present disclosure describes a method 100 and a system/controller 60, 64, 76 which "sweeps" through a series of varying commanded fuel masses (represented by corresponding pulse widths) and varying fuel pressures to "learn" what the opening delay is for one or more fuel injector 62. Once the opening delay is learned for each injector 62, this information may be used to adjust the opening time for each respective injector 62 so as to compensate for the opening delay.

Figure 1:
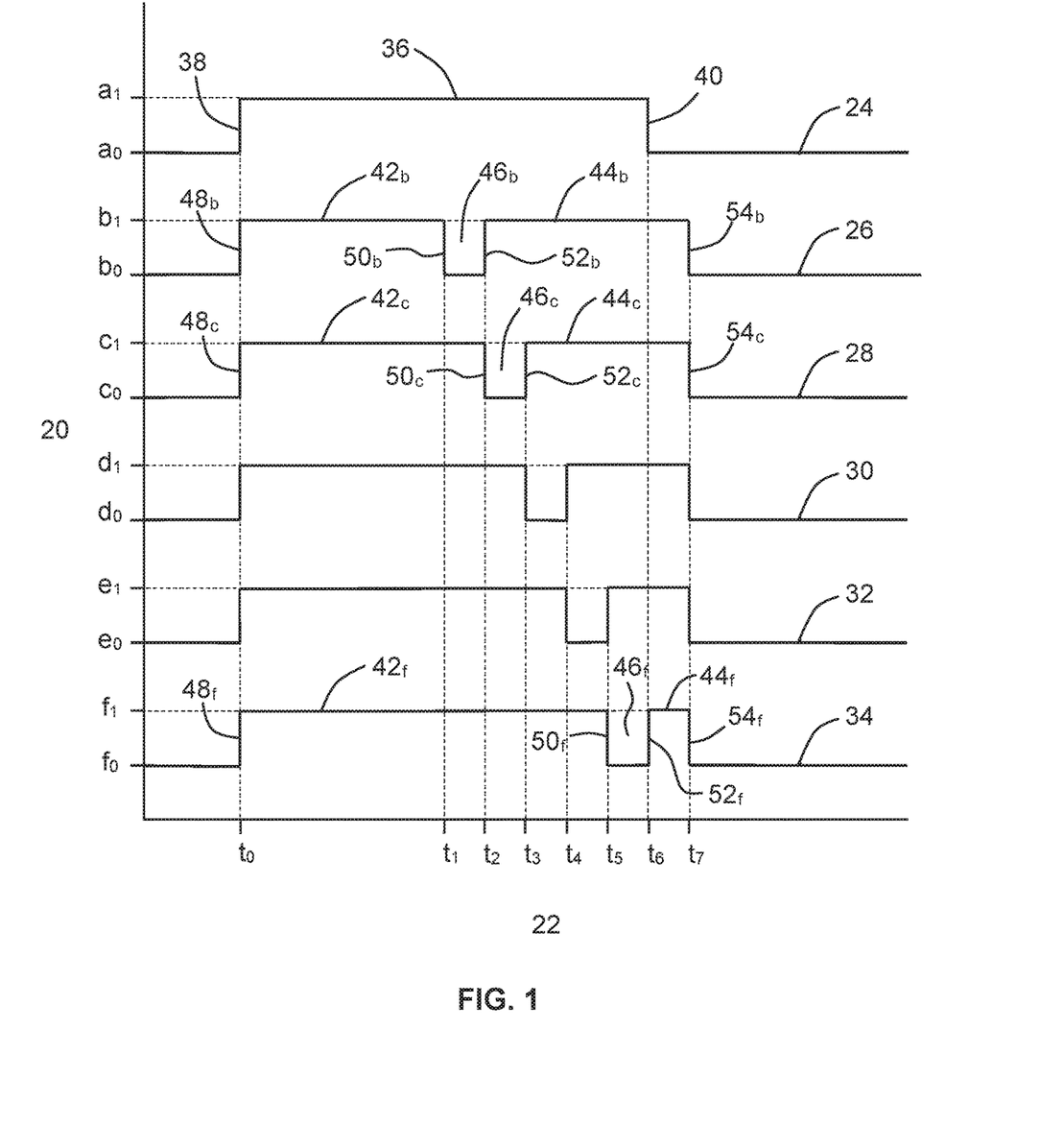
FIG. 1 is a graphic showing a progression of pulse width or mass sweeps for the method of the present disclosure.

FIG. 1 is a graphic showing a progression of pulse width or commanded fuel mass sweeps for the method of the present disclosure. The progression begins with a baseline injector profile 24 at the top of the graphic, and sweeps downward through a first modified injector profile 26, a second modified injector profile 28, a third modified injector profile 30, a fourth modified injector profile 32, and a fifth modified injector profile 24. Note that while five modified injector profiles are shown, some situations may call for more or less than five modified injector profiles. Also note that subscript "a" is used to represent the baseline injector profile, subscripts "b" through "f" are used to represent the respective first through fifth modified injector profiles, and subscripts "0" and "1" denote respective "closed" and "open" states for the injector 62. FIG. 1 will be referenced again further below in connection with some of the other drawings.

Figure 2:
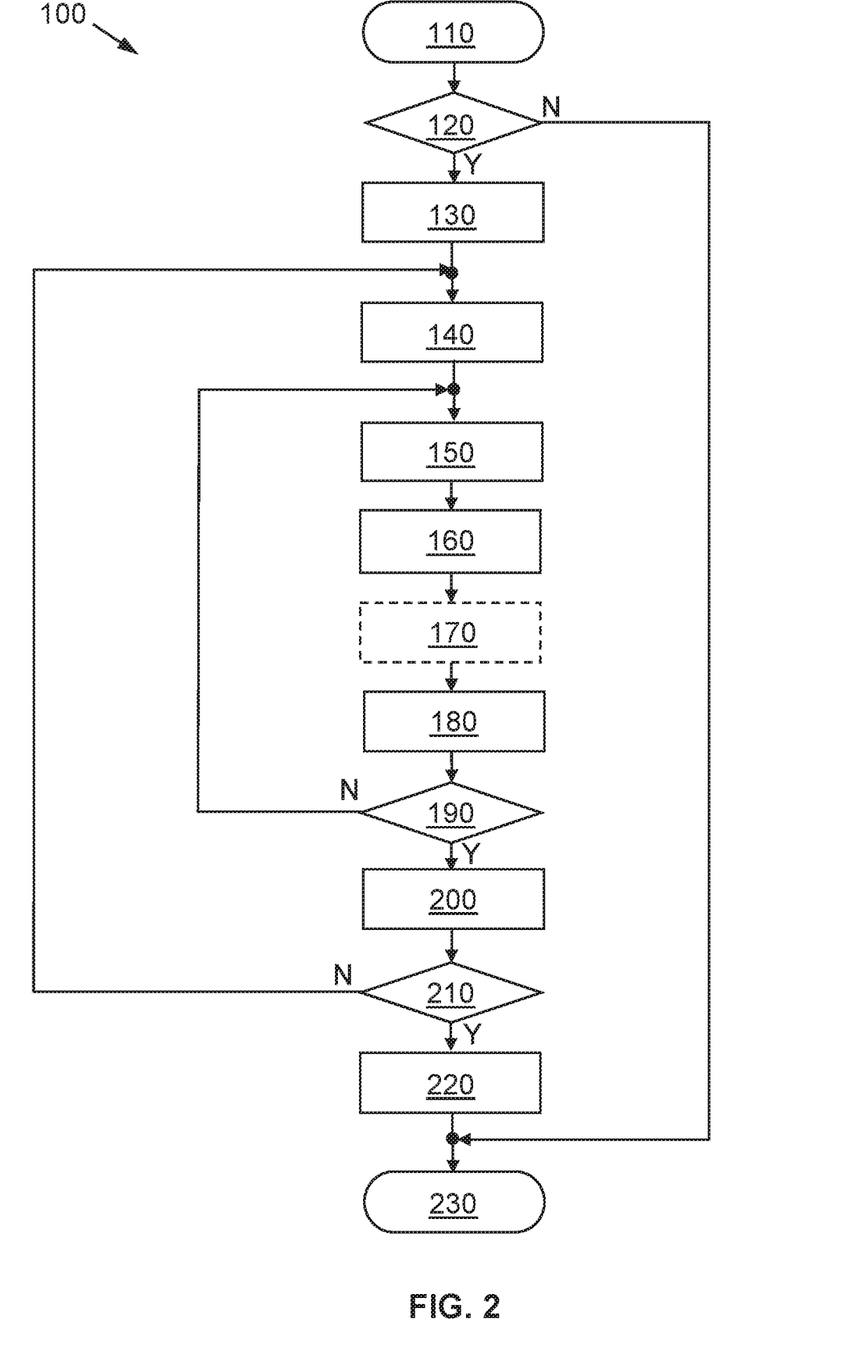
FIG. 2 is a flowchart for the method of the present disclosure.
Figure 3:
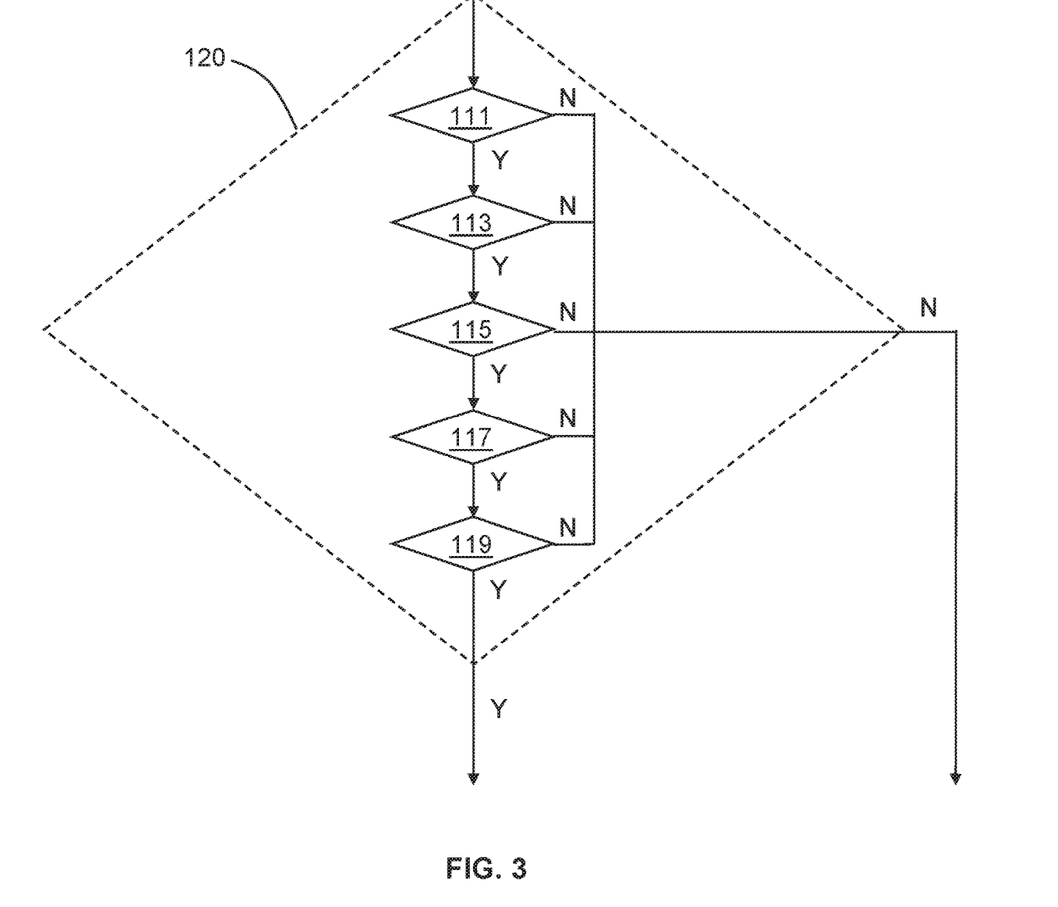
FIG. 3 is an expansion of block 120 from FIG. 2.

FIG. 2 shows a flowchart for the method 100 of operating a fuel injector 62 according to the present disclosure. Block 110 is the start of the method 100, and at block 120 a determination is made as to whether certain conditions are met. These conditions are illustrated in FIG. 3, where block 120 is expanded to show an example of the conditions which may be interrogated. For example, block 111 may be "Accumulated fuel mass enabled?", block 113 may be "Engine coolant within range?", block 115 may be "RPMs within range?", block 117 may be "Engine load within range?", and block 119 may be "Less than three pulses commanded?". If each of these conditions are met, then the flow moves on to block 130, but if any condition is not met, then the flow moves to block 230 which ends the method 100. (Note that once the method 100 is exited, it may be immediately restarted at block 110.)

At block 130, a fuel pressure (e.g., the fuel rail pressure) and a total fuel mass $M_{TF}$ to be injected by the fuel injector 62 per combustion cycle are determined. For example, 10 milligrams (10 mg) may be injected by the injector 62 per combustion cycle (i.e., $M_{TF}$=10 mg). Note that the total fuel mass $M_{TF}$ to be injected per combustion cycle may vary for different combustion or engine performance regimes, such as cold start-up, warm start-up, coasting at constant highway speed, etc. Also note that the aforementioned total fuel mass $M_{TF}$ is per injector or per cylinder; thus, for engines having more than one injector or cylinder, this total fuel mass $M_{TF}$ may be determined for each injector or cylinder.

At block 140, a first pulse width $PW_1$ corresponding to a first commanded fuel mass $CM_1$ and a second pulse width $PW_2$ corresponding to a second commanded fuel mass $CM_2$ are defined, wherein $CM_1+CM_2=M_{TF}$. (In other words, the total fuel mass $M_{TF}$ may be split into two commanded fuel masses, i.e., $CM_1$ and $CM_2$, which together are equivalent in mass to the total fuel mass $M_{TF}$.) Optionally, a baseline pulse width $PW_B$ (corresponding to the total fuel mass $M_{TF}$) may be calculated by knowing the fuel pressure and the total fuel mass $M_{TF}$ to be injected per combustion event. Just as the total fuel mass $M_{TF}$ is divided into two smaller commanded fuel masses $CM_1$ and $CM_2$, the baseline pulse width $PW_B$ may be viewed as being divided into two smaller pulse widths $PW_1$ and $PW_2$, since $M_{TF}$, $CM_1$ and $CM_2$ correspond to $PW_B$, $PW_1$ and $PW_2$, respectively. (Thus since $CM_1+CM_2=M_{TF}$, it should likewise generally be true that $PW_1+PW_2=PW_B$.) In an exemplary embodiment, the first commanded fuel mass $CM_1$ may be approximately half of the total fuel mass $M_{TF}$, and likewise the first pulse width $PW_1$ may be approximately half of the baseline pulse width $PW_B$; therefore, in such a case, the second commanded fuel mass $CM_2$ would likewise be approximately half of the total fuel mass $M_{TF}$ and the second pulse width $PW_2$ would be approximately half of the baseline pulse width $PW_B$. Note, however, that the calculation or determination of a baseline pulse width $PW_B$ is optional, and therefore is not necessarily required according to the method 100 of the present disclosure.

Turning again to FIG. 1, the baseline injector profile 24 shows an optional or exemplary baseline pulse width $PW_B$, 36 which is representative of the total fuel mass $M_{TF}$ (i.e., the total mass of fuel to be injected per cylinder and per combustion cycle). The baseline pulse width $PW_B$/total fuel mass $M_{TF}$ (both represented by reference numeral 36) is shown beginning at time $t_0$ by rising at ramp 38 from an initial value $a_0$ (representing that the injector 62 is closed) to a higher value $a_1$ (representing that the injector 62 is opened), and ending at time $t_6$ by falling at ramp 40 back to the initial value $a_0$. For purposes of illustration, the baseline pulse width $PW_B$, 36 may correspond to a fuel mass $M_{TF}$ of 10 milligrams (i.e., M=10 mg). The first modified injector profile 26 shows this 10 mg amount of fuel divided in half, resulting in a first pulse width $PW_1$, $42_b$ of 5 mg (beginning at ramp 48b and ending at ramp 50b) corresponding to the first commanded fuel mass $CM_1$, and a second pulse width $PW_2$, $44_b$ of 5 mg (beginning at ramp $52_b$ and ending at ramp $54_b$) corresponding to the second commanded fuel mass $CM_2$. Note that while FIGS. 3 and 5 are described herein in terms of "pulse widths" which may be viewed as increments of time, the baseline, first and second pulse widths $PW_B$, $PW_1$, $PW_2$ may also be viewed as respective increments of mass (i.e., $M_{TF}$, $CM_1$, $CM_2$), and vice versa. Note that while a baseline injector profile 24 is shown in FIG. 1, this is for illustrative purposes, and the method 100 of the present disclosure does not require such a baseline injector profile 24 to be determined or actuated. Once the total fuel mass $M_{TF}$ is determined, the two smaller commanded fuel masses $CM_1$ and $CM_2$, and/or the respective pulse widths $PW_1$ and $PW_2$ which correspond to $CM_1$ and $CM_2$, may be determined.

At block 150, the fuel injector 62 is actuated for the first pulse width $PW_1$, $42_b$ and the second pulse width $PW_2$, $44_b$, separated by a pause $46_b$ between the first pulse width $PW_1$, $42_b$ and the second pulse width $PW_2$, $44_b$. This pause or gap $46_b$ may be, for example, 2 milliseconds (2 ms). Note that because of the gap $46_b$, the duration of both pulse widths $42_b$, $44_b$ is from $t_0$ to $t_7$, whereas the duration for the baseline pulse width 36 is from $t_0$ to $t_6$. Thus, the difference in time between $t_6$ and $t_7$ is equal to the gap $46_b$. In an exemplary embodiment, the first pulse width $PW_1$ may be actuated before the second pulse width $PW_2$; however, note that this order may be reversed. The actuating step 150 may be performed for each of one or more combustion cycles.

At block 160, an opening delay for the fuel injector 62 is detected for the first pulse width $PW_1$, the second pulse width $PW_2$, or both pulse widths $PW_1$, $PW_2$. Each opening delay is an amount of time between the fuel injector 62 being commanded to open and the fuel injector 62 being substantially opened. ("Substantially opened" may be any suitable definition, including but not limited to when the injector 62 has risen to 85%, 90% or 95% of the normal rate of fuel delivery for the injector 62.) As discussed in more detail below, the opening delay may be detected by sensing a feedback voltage from the fuel injector 62 after the injector 62 is commanded to open.

At block 170, the opening delay for the first and/or second pulse widths $PW_1$, $PW_2$ is stored. Note that block 170 is presented in dashed lines; this is done to indicate that block 170 does not have to appear at this particular place in the method 100. For example, block 170 may occur after block 180 or at other points in the flow logic.

At block 180, the first pulse width $PW_1$ is increased by a predetermined pulse width amount and the second pulse width $PW_2$ is decreased by the predetermined pulse width amount. For example, the predetermined pulse width amount may be 1 mg, or any other suitable amount. Accordingly, the first pulse width $PW_1$ may be increased from 5 mg to 6 mg and the second pulse width $PW_2$ may be decreased from 5 mg to 4 mg, as shown by the second modified injector profile 28. Note that both the first and second modified injector profiles 26, 28 (and in fact, all the modified injector profiles) provide a total of 10 mg of fuel, which is the same amount delivered as with the baseline injector profile 24.

At block 190, the actuating step 150, the detecting step 160, and the increasing and decreasing step 180 are repeated until (i) the second pulse width $PW_2$ is less than or equal to a predetermined minimum pulse width $PW_{min}$, or (ii) the second commanded fuel mass $CM_2$ is less than or equal to a predetermined minimum commanded fuel mass $CM_{min}$, or (iii) both (i) and (ii) are achieved. (Note that the storing step 170 may also be repeated along with the aforementioned steps 150, 160, 180.) In other words, the loop of steps 150, 160, 170 and 180 may be repeated, with the first pulse width $PW_1$ increasing and the second pulse width $PW_2$ decreasing in each loop, until $PW_{min}$ and/or $CM_{min}$ is/are reached. The predetermined minimum commanded fuel mass $CM_{min}$ and the predetermined minimum pulse width $PW_{min}$ may be, for example, 1 mg or some corresponding number of microseconds, as illustrated in FIG. 1. With this repeated looping, the total fuel amount $M_{TF}$ to be injected by the fuel injector 62 per combustion cycle (e.g., 10 mg) is "swept" through a progression of two separate pulse widths $PW_1$, $PW_2$ (and thus two separate commanded fuel masses $CM_1$, $CM_2$) until $PW_{min}$ and/or $CM_{min}$ is/are reached. Also, during each loop, the opening delay of the first and/or second pulse widths $PW_1$, $PW_2$ is detected and stored for subsequent use, as discussed below.

At block 200, the fuel pressure is changed by a predetermined pressure amount. The fuel pressure (e.g., the fuel rail pressure) may be changed by increasing or decreasing the pressure. In an exemplary embodiment, the initial fuel pressure determined at block 130 may be 3000 psi, and the pressure may be decreased by a predetermined pressure amount of 100 psi. Note that while the total amount of fuel to be injected per combustion cycle remains the same, once the fuel pressure has been changed (e.g., decreased) a new baseline pulse width $PW_B$ will need to be determined.

At block 210, the defining step 140, the actuating step 150, the detecting step 160, the storing step 170, the increasing and decreasing step 180, the repeating step/loop 190, and the changing 200 step are cycled through, until the fuel pressure reaches a predetermined target fuel pressure. For example, the fuel pressure may be repeatedly decreased in 100 psi increments from an initial pressure of 3000 psi down to a predetermined target fuel pressure of 1000 psi. At each of these fuel pressures (e.g., 2900 psi, 2800 psi, 2700 psi, and down to 1000 psi), a new baseline pulse width $PW_B$ is determined, and the two smaller pulse widths $PW_1$ and $PW_2$ are again "swept" (i.e., incremented and decremented) and the opening delays are detected and stored. Once the fuel pressure has reached the predetermined target fuel pressure, the flow logic exits block 210 and moves to block 220. At this point, a wide range of pressures and pulse width combinations have been implemented, and the corresponding opening delays have been detected and stored. This provides a collection of opening delay data which can be used to determine an average or representative opening delay for each fuel pressure level, as well as for each combination of fuel pressure and pulse width.

At block 220, the fuel injector 62 may be commanded to open earlier than a normally commanded opening time, by a lead time, which is based on the stored opening delay data. In other words, once the average or representative opening delay is known for a given fuel pressure or fuel pressure-pulse width combination, the fuel injector 62 can be commanded to open earlier than it normally would, by an amount of time (i.e., a lead time) corresponding to the average or representative opening delay. Thus, the opening delay exhibited by an injector 62 can be detected for a range of fuel pressure-pulse width combinations, and fuel injector 62 can be commanded to open up earlier to compensate for this detected opening delay.

The lead time may be the same as the average or representative opening delay, or it may be some other amount of time corresponding to the average or representative opening delay. This step 220 of commanding the injector 62 to open earlier than normal may be implemented at any time after the average or representative opening delay is determined.

The method 100 may also be implemented in connection with more than one fuel injector 62. Thus, a method 100 of controlling a plurality of fuel injectors 62 may include the steps of: (a) determining a fuel pressure and a total fuel mass Mm to be injected by each of the fuel injectors 62 per combustion cycle; (b) defining a first pulse width $PW_1$ corresponding to a first commanded fuel mass $CM_1$ and a second pulse width $PW_2$ corresponding to a second commanded fuel mass $CM_2$, wherein $CM_1+CM_2=M_{TF}$; (c) actuating each of the fuel injectors 62 for the first pulse width $PW_1$ and the second pulse width $PW_2$, separated by a pause or gap 46 between the first and second pulse widths $PW_1$, $PW_2$; (d) detecting an opening delay for each of the fuel injectors 62 for at least one of the first and second pulse widths $PW_1$, $PW_2$; (e) storing the opening delay for each of the fuel injectors 62 for the at least one of the first and second pulse widths $PW_1$, $PW_2$; (f) increasing the first pulse width $PW_1$ by a predetermined pulse width amount and decreasing the second pulse width $PW_2$ by the predetermined pulse width amount; (g) repeating the actuating, detecting, storing, increasing and decreasing steps until the second pulse width $PW_2$ is less than or equal to a predetermined minimum pulse width $PW_{min}$ and/or until the second commanded fuel mass $CM_2$ is less than or equal to a predetermined minimum commanded fuel mass $CM_{min}$; (h) changing the fuel pressure by a predetermined pressure amount; and (i) cycling through the defining, actuating, detecting, storing, increasing, decreasing, repeating and changing steps until the fuel pressure reaches a predetermined target fuel pressure. The method 100 may further include: (j) commanding each of the fuel injectors 62 to open earlier than a respective normally commanded opening time by a respective lead time, wherein each respective lead time is based on respective stored opening delay data.

As mentioned earlier, the actuating step may be performed for each of one or more combustion cycles. A collection of opening delay data may be accumulated for each of the fuel injectors 62, and each opening delay may be detected by sensing a feedback voltage from a respective fuel injector 62, as will now be described in more detail in the context of a system or controller.

Figure 4:
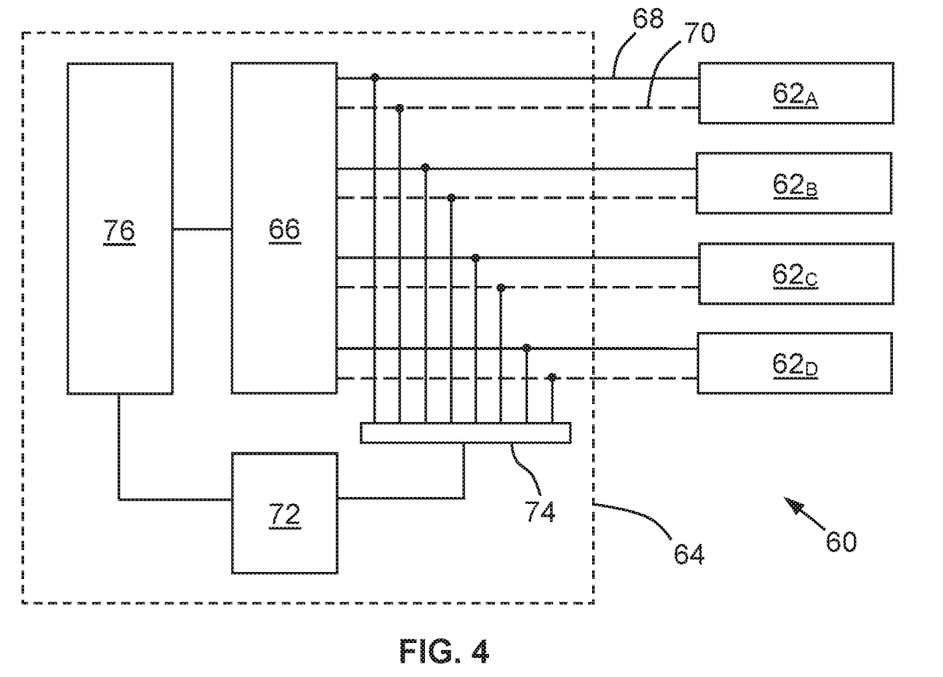
FIG. 4 is a schematic of a controller for controlling a plurality of fuel injectors.

FIG. 4 shows a schematic of a controller for controlling a plurality of fuel injectors 62. Referring also to the method 100 shown in FIG. 2, the controller may be configured to execute the steps of: determining a fuel pressure and a total fuel mass $M_{TF}$ to be injected by each of the fuel injectors 62 per combustion cycle (block 130); defining a first pulse width $PW_1$ corresponding to a first commanded fuel mass $CM_1$ and a second pulse width $PW_2$ corresponding to a second commanded fuel mass $CM_2$, wherein $CM_1+CM_2=M_{TF}$ (block 140); actuating each of the fuel injectors 62 for the first pulse width and the second pulse width $PW_1$, $PW_2$, separated by a pause between the first and second pulse widths $PW_1$, $PW_2$ (block 150); detecting an opening delay for each of the fuel injectors 62 for at least one of the first and second pulse widths (block 160); storing the opening delay for each of the fuel injectors 62 for the at least one of the first and second pulse widths $PW_1$, $PW_2$ (block 170); increasing the first pulse width $PW_1$ by a predetermined pulse width amount and decreasing the second pulse width $PW_2$ by the predetermined pulse width amount (block 180); repeating the actuating, detecting, storing, increasing and decreasing steps (blocks 150-180) until the second pulse width $PW_2$ is less than or equal to a predetermined minimum pulse width $PW_{min}$ and/or the second commanded fuel mass $CM_2$ is less than or equal to a predetermined minimum commanded fuel mass $CM_{min}$ (block/loop 190); changing the fuel pressure by a predetermined pressure amount (block 200); and cycling through the defining, actuating, detecting, storing, increasing, decreasing, repeating and changing steps (blocks 140-200) until the fuel pressure reaches a predetermined target fuel pressure (block 210). The controller may be further configured to execute the step of commanding each of the fuel injectors 62 to open earlier than a respective normally commanded opening time by a respective lead time, wherein each respective lead time is based on respective stored opening delay data (block 220).

As illustrated in FIG. 4, a controller or control system 60 for a plurality of injectors 62 may include an engine control unit (ECU) 64 or other engine-related module which is operatively connected to each injector 62 via one or more signal paths 68, 70. For example, path 68 may be a "Supply", "Command", "Trigger" or other signal, and path 70 may be a "Ground", "Enable" or other signal/path. In an exemplary embodiment, path 68 may be a "Supply" signal path which is used to trigger or deliver a command to the injector 62 to open (e.g., by switching from a lower voltage level to a higher voltage level), and path 70 may be an "Enable" path which may be used as a ground.

The ECU 64 may include an injector driver 66 configured to operatively connect by the one or more signal paths 68, 70 to each of the fuel injectors 62, and to selectively command each of the fuel injectors 62 to open and close. The ECU 64 may also include a monitoring module 72 configured to monitor a voltage of each respective signal path 68, 70 and/or between selected pairs of signal paths 68, 70. For example, the monitoring module 72 may be operatively connected to a bus 74 which is electrically connected with the signal paths 68, 70, and the monitoring module 72 may monitor or detect a voltage difference between respective pairs of signal paths 68, 70 that are associated with respective fuel injectors 62.

The injector driver 66 and the monitoring module 72 may be operatively connected to a processor 76, which may include an instruction set or programming logic for executing the method 100 described herein. The processor 76 may include a memory, and the processor 76 may accumulate a collection of opening delay data in the memory for each of the fuel injectors 62. As mentioned above (and as will be explained further below), each opening delay may be detected by sensing a feedback voltage from a respective fuel injector 62, and each opening delay may be stored in the memory to create a collection or table of opening delay data.

FIG. 4 shows a certain hierarchy or architecture, where a system 60 includes an ECU 64, and the ECU 64 includes an injector driver 66, a monitoring module 72 and a processor 76. However, an apparatus or system according to the present disclosure may assume other hierarchies, architectures and forms as well. For example, a "controller" according to the present disclosure may include the system 60, the ECU 64 or the processor 76. For this reason, some mentions of a "controller" in this specification do not include a specific reference numeral, but may be read as referring to a system 60, an ECU 64 and/or a processor 76.

Figure 5:
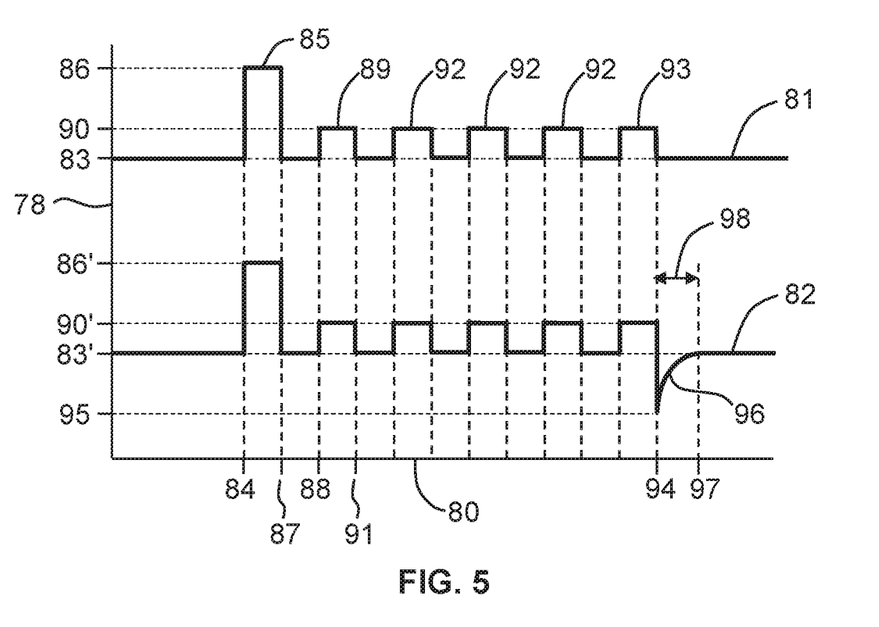
FIG. 5 is a graphic showing a command signal and a monitored voltage signal for the controller shown in FIG. 4.

FIG. 5 is a graphic showing a command signal 81 and a monitored voltage signal 82 for the controller shown in FIG. 4. The command signal 81 may be associated with a voltage of signal path 68, and the monitored voltage signal 82 may be associated with a voltage of signal path 70 or a voltage difference between signal paths 68 and 70. The left vertical axis 78 may represent voltage level and the horizontal axis 80 may represent time (e.g., in milliseconds or microseconds).

Note that when a single "pulse" is called for for a given combustion event, the fuel injector 62 may actually be triggered or commanded in a series of smaller pulses which are equivalent (in terms of the amount of fuel to be injected) to the single "pulse" that is called for. For example, the single baseline pulse width 36 of FIG. 1 may be represented by the series of pulses 85, 89, 92, 93 of command signal 81 in FIG. 5. Likewise, each of the first and second pulse widths $PW_1$, $PW_2$ of FIG. 1 may also be commanded as a series of small pulses. However, it is also possible that a series of smaller pulses is not used, and instead a single pulse is commanded.

Command signal 81 begins at a low or zero voltage 83 which corresponds to the "closed" state in which the injector 62 is closed and not delivering any fuel. At a given time 84, a command may be given (i.e., the command signal voltage level is increased) to cause a pulse 85 up to a given voltage level 86 and the injector 62 is opened to deliver fuel into its respective cylinder. After a few microseconds at time 87, the pulse 85 may drop back to the low or zero level 83 and close, and then a few microseconds later at time 88, another pulse 89 may be commanded, but at a voltage level 90 that is lower than the level 86 of the previous pulse 85. This smaller pulse 89 may end a few microseconds later at time 91, and a series of similar smaller pulses 92 may occur at given intervals. Finally, a final small pulse 93 may be commanded, and then may be ended at time 94. Note that while a single large pulse and five smaller pulses are shown, other combinations of pulses and durations are also possible. This example of a larger initial pulse 85 followed by several smaller pulses 89, 92, 93 may be characterized as a "peak and hold" injection approach.

Monitored voltage signal 82 appears to be similar to command signal 81, with voltage levels 83', 86' and 90' corresponding to voltage levels 83, 86 and 90, respectively. However, note that at the end of the last pulse (at time 94), the monitored voltage signal 82 drops down to a voltage level 95 that is lower than the typical low or zero voltage 83'. The monitored voltage signal 82 then returns to the normal low or zero level 83' at time 97 via a rebound path 96 whose time duration (from times 94 to 97) is represented by the double-arrow 98. This drop 95 and return 96 in voltage may be referred to as a "feedback voltage" or a "fly-back voltage", and is characteristic of the response of many types of fuel injectors 62. This feedback or fly-back voltage may be used to determine the opening delay for a given injector and a given fuel pressure level. Note that while the controller may detect this feedback or fly-back voltage, the "opening delay data" that is stored may be this voltage, or it may be a corresponding opening delay amount of time which is calculated or derived from this voltage. Also note that while the present disclosure has focused on opening delay, a similar approach may be used for closing delay, which is the time difference between when an injector 62 is commanded to close and when the injector 62 has actually substantially closed. ("Substantially closed" may be any suitable definition, including but not limited to when the injector 62 has dropped to 15%, 10% or 5% of the normal rate of fuel delivery for the injector 62.)

Once the controller has swept through the increasing/decreasing pairs of first and second pulse widths $PW_1$ and $PW_2$ (and thus through the pairs of first and second commanded fuel masses $CM_1$ and $CM_2$) and has swept through the changes in fuel pressure level, a collection of opening delay data will have been collected for each injector 62. In this way, the controller may "learn" what the opening delay is for each injector 62 at the interrogated fuel levels and pulse widths. The controller may then utilize this data to make adjustments or compensations to the timing of future commanded pulse widths. Note that this "learning" process may occur periodically, since injectors 62 may experience a change in their respective opening delays over time. The controller may overwrite previously collected opening delay data with newly accumulated opening delay data, or it may retain previous collections so that a trend in the change in opening delay over time may be determined, which may be used to indicate the state-of-health or other characteristics of each injector 62. The controller may also include an ability to detect when a new injector 62 has been installed so that the "learning" process may be performed for that new injector 62. Thus, the method 100 may be performed on only selected ones of the injectors 62 as needed, and does not have to be performed on all injectors 62 at the same time.

The above description is intended to be illustrative, and not restrictive. While various specific embodiments have been presented, those skilled in the art will recognize that the disclosure can be practiced with various modifications within the spirit and scope of the claims. For example, the above-described embodiments (and/or aspects thereof) may be used in combination with each other. As used herein, an element or step recited in the singular and preceded by the word "a" or "an" should be understood as not excluding plural of such elements or steps, unless such exclusion is explicitly stated. Additionally, the phrase "at least one of A and B" and the phrase "A and/or B" should each be understood to mean "only A, only B, or both A and B".

The flowcharts and block diagrams in the drawings illustrate the architecture, functionality and/or operation of possible implementations of systems, methods and computer program products according to various embodiments of the present disclosure. In this regard, each block in the flowchart or block diagrams may represent a module, segment or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by hardware-based systems that perform the specified functions or acts, or combinations of hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the functions and/or actions specified in the flowcharts and block diagrams.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A method of operating a fuel injector, comprising:
   determining a fuel pressure and a total fuel mass $M_{TF}$ to be injected by the fuel injector per combustion cycle;
   defining a first pulse width corresponding to a first commanded fuel mass $CM_1$ and a second pulse width corresponding to a second commanded fuel mass $CM_2$, wherein $CM_1+CM_2=M_{TF}$;
   actuating the fuel injector for the first pulse width and the second pulse width, separated by a pause between the first and second pulse widths;
   detecting an opening delay for the fuel injector for at least one of the first and second pulse widths;
   increasing the first pulse width by a predetermined pulse width amount and decreasing the second pulse width by the predetermined pulse width amount;
   repeating the actuating, detecting, increasing and decreasing steps;
   determining that the second pulse width is less than or equal to a predetermined minimum pulse width; and
   halting the repeating the actuating, detecting, increasing and decreasing steps in response to determining that the second pulse width is less than or equal to the predetermined minimum pulse width.

2. A method according to claim 1, further comprising:
   changing the fuel pressure by a predetermined pressure amount; and
   cycling through the defining, actuating, detecting, increasing, decreasing, repeating and changing steps until the fuel pressure reaches a predetermined target fuel pressure.

3. A method according to claim 2, further comprising:
   storing, after the detecting step, the opening delay for the at least one of the first and second pulse widths; and
   commanding the fuel injector to open earlier than a normally commanded opening time by a lead time based on stored opening delay data.

4. A method according to claim 1, wherein the actuating step is performed for each of one or more combustion cycles.

5. A method according to claim 2, wherein a collection of opening delay data is accumulated.

6. A method according to claim 1, wherein the first pulse width is actuated before the second pulse width.

7. A method according to claim 1, wherein the first commanded fuel mass $CM_1$ is half of the total fuel mass $M_{TF}$.

8. A method according to claim 1, wherein each opening delay is an amount of time between the fuel injector being commanded to open and the fuel injector being substantially opened.

9. A method according to claim 1, wherein each opening delay is detected by sensing a feedback voltage from the fuel injector.

10. A method of controlling a plurality of fuel injectors, comprising:
    determining a fuel pressure and a total fuel mass $M_{TF}$ to be injected by each of the fuel injectors per combustion cycle;
    defining a first pulse width corresponding to a first commanded fuel mass $CM_1$ and a second pulse width corresponding to a second commanded fuel mass $CM_2$, wherein $CM_1+CM_2=M_{TF}$;
    actuating each of the fuel injectors for the first pulse width and the second pulse width, separated by a pause between the first and second pulse widths;
    detecting an opening delay for each of the fuel injectors for at least one of the first and second pulse widths;
    storing the opening delay for each of the fuel injectors for the at least one of the first and second pulse widths;
    increasing the first pulse width by a predetermined pulse width amount and decreasing the second pulse width by the predetermined pulse width amount;
    repeating the actuating, detecting, storing, increasing and decreasing steps until the second pulse width is less than or equal to a predetermined minimum pulse width and/or until the second commanded fuel mass $CM_2$ is less than or equal to a predetermined minimum commanded fuel mass $CM_{min}$;
    changing the fuel pressure by a predetermined pressure amount;
    cycling through the defining, actuating, detecting, storing, increasing, decreasing, repeating and changing steps;
    determining that the fuel pressure reaches a predetermined target fuel pressure; and
    halting the cycling through the defining, actuating, detecting, storing, increasing, decreasing, repeating and changing steps in response to determining that fuel pressure reaches the predetermined target fuel pressure.

11. A method according to claim 10, further comprising:
    commanding each of the fuel injectors to open earlier than a respective normally commanded opening time by a respective lead time, wherein each respective lead time is based on respective stored opening delay data.

12. A method according to claim 10, wherein the actuating step is performed for each of one or more combustion cycles.

13. A method according to claim 10, wherein a collection of opening delay data is accumulated for each of the fuel injectors.

14. A method according to claim 10, wherein each opening delay is detected by sensing a feedback voltage from a respective fuel injector.

15. A controller for controlling a plurality of fuel injectors, the controller being configured to execute the steps of:
    determining a fuel pressure and a total fuel mass $M_{TF}$ to be injected by each of the fuel injectors per combustion cycle;
    defining a first pulse width corresponding to a first commanded fuel mass $CM_1$ and a second pulse width corresponding to a second commanded fuel mass $CM_2$, wherein $CM_1+CM_2=M_{TF}$;
    actuating each of the fuel injectors for the first pulse width and the second pulse width, separated by a pause between the first and second pulse widths;
    detecting an opening delay for each of the fuel injectors for at least one of the first and second pulse widths;
    storing the opening delay for each of the fuel injectors for the at least one of the first and second pulse widths;
    increasing the first pulse width by a predetermined pulse width amount and decreasing the second pulse width by the predetermined pulse width amount;
    repeating the actuating, detecting, storing, increasing and decreasing steps until the second pulse width is less than or equal to a predetermined minimum pulse width and/or until the second commanded fuel mass $CM_2$ is less than or equal to a predetermined minimum commanded fuel mass $CM_{min}$;
    changing the fuel pressure by a predetermined pressure amount;
    cycling through the defining, actuating, detecting, storing, increasing, decreasing, repeating and changing steps;

determining that the fuel pressure reaches a predetermined target fuel pressure; and halting the cycling through the defining, actuating, detecting, storing, increasing, decreasing, repeating and changing steps in response to determining that fuel pressure reaches the predetermined target fuel pressure.

16. A controller according to claim 15, wherein the controller is further configured to execute the step of:

commanding each of the fuel injectors to open earlier than a respective normally commanded opening time by a respective lead time, wherein each respective lead time is based on respective stored opening delay data.

17. A controller according to claim 16, wherein the controller includes:

an injector driver configured to operatively connect by a respective signal path to each of the fuel injectors and to selectively command each of the fuel injectors to open and close; and a monitoring module configured to monitor a voltage of each respective signal path.

18. A controller according to claim 15, wherein the controller includes a memory and the controller accumulates a collection of opening delay data in the memory for each of the fuel injectors.

19. A controller according to claim 15, wherein each opening delay is detected by sensing a feedback voltage from a respective fuel injector.

* * * * *